Nov. 20, 1934.     C. H. ZWERMANN     1,981,020
WATER CLOSET BOWL
Filed April 28, 1932
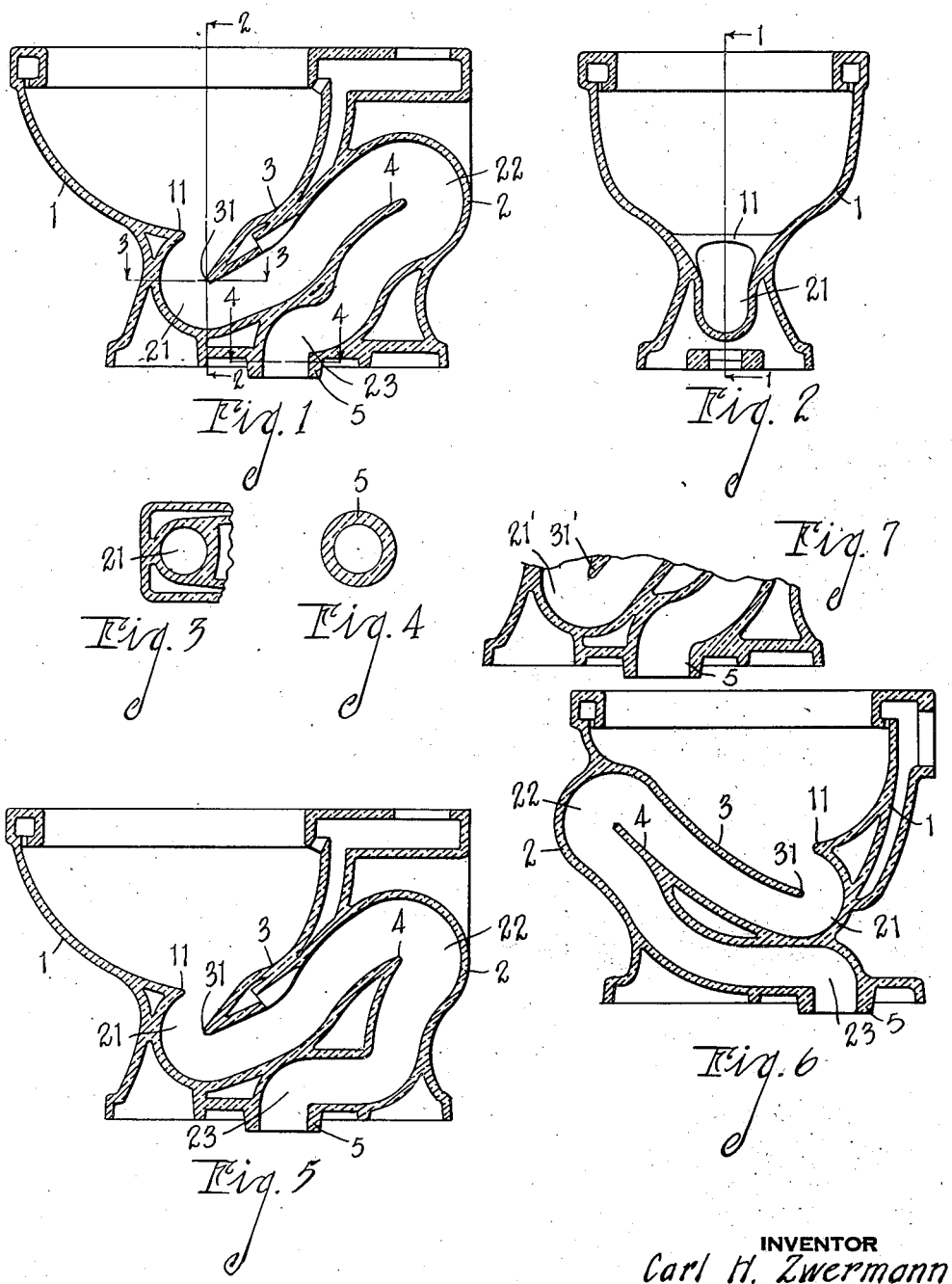
INVENTOR
Carl H. Zwermann
BY
Chappell + Earl
ATTORNEYS.

Patented Nov. 20, 1934

1,981,020

UNITED STATES PATENT OFFICE 1,981,020

WATER CLOSET BOWL

Carl H. Zwermann, Robinson, Ill.; Helene Zwermann and Carl H. Zwermann, Jr., executrix and executor of said Carl H. Zwermann, deceased Application April 28, 1932, Serial No. 607,902

8 Claims. (Cl. 4—69)

This invention relates to improvements in water closet bowls and is of especial advantage in siphonic action bowls, though adaptable to any bowl.

The main object of the invention is to provide a structure in which the clogging of the siphon or trap beyond its intake is eliminated.

Objects which pertain to details will appear from the description to follow. Preferred embodiments of the invention are illustrated in the accompanying drawing, in which:

Fig. 1 is a vertical longitudinal section through a closet bowl showing the details of construction, taken on line 1—1 of Fig. 2.

Fig. 2 is a detail transverse sectional view of the said structure taken on section line 2—2 of Fig. 1.

Fig. 3 is a detail horizontal sectional view through the structure near the intake of the siphon or trap on the horizontal section line 3—3 of Fig. 2.

Fig. 4 is a detail horizontal sectional view on line 4—4 of Fig. 1 through the choke of the said siphon or trap.

Fig. 5 is a detail vertical longitudinal sectional view comparable to Fig. 1 of a slightly modified construction.

Fig. 6 is a similar detail vertical longitudinal sectional view of a water closet with the siphon or trap disposed at the front of the bowl.

Fig. 7 is a detail of a modification of the structure of Fig. 1 showing slightly different disposition of the intake structure of the siphon or trap.

The parts will be identified by their numerals of reference which are the same in all the views.

1 is the water closet bowl of a usual siphonic action. 2 is the siphon generally, in Fig. 1, disposed back of the rear wall 3 of the said bowl. The intake 21 of the siphon or trap is formed with its front wall defined by a segment of a circle centered in the front edge 31 of the rear wall. The passage is defined by a wall which is preferably a semi-circle although the extent of the curved part may be varied and may be more or less as circumstances of construction require. 4 is the dam in the siphon and the siphon or trap is formed around the same at 22, preferably with a circular surface, the center of which is the edge of the dam 4 and the passage is recurved upon itself preferably in this form. The radius of this circle is greater than the radius of the circle of the wall at the intake. The siphon from the dam downwardly has converging walls with a horizontally directed portion at 23 leading to a choke 5 which is practically of the same cross section as the intake to the trap or siphon.

In Fig. 5 the details of the passages are somewhat modified as can be readily seen and it is not deemed necessary to renumber the same.

In Fig. 6 the siphon is shown at the front of the bowl with the same characteristics as those described in relation to Fig. 1.

In Fig. 7 the intake 21' to the siphon is made more nearly vertical than intake 21 and the front edge of the rear wall 31' is substantially vertical. The form of the siphon from 21 around to the choke 5' is only required to be of such form that the chord of any arc which crosses the edge of the dam, and/or any other bend in the trap way, shall be greater than the maximum length of any chord, of the circle defining the intake opening, that contacts with the edge of the opposite wall of the bowl.

The relation between the curve at the intake 21 and the remaining curves in the structure can also be defined as being such that the chord of any curve on the wall of the passage, which chord is tangential to the opposite wall or any wall of the passage, is longer than the shortest chord of any curve on the wall of the inlet 21 which chord is tangential to the opposite wall of the curve at the point 31. This, in terms of articles that will pass through, is such that a straight object which represents the chord of a curve on the wall that is of such length that it can pivot around the point 31 to pass through the discharge passageway, will not become lodged in the rest of the passageway because it can pivot around any turn in the passageway.

It will be seen that, by this conformation of the curve at the discharge, to allow only the passage of objects that will not pass freely through the rest of the discharge passage, it is possible to have an opening through the passage of a capacity to handle sufficient water to accomplish the flushing purposes and to carry out ordinary matter deposited in the bowl.

This defines the structure in its most perfect form. However, practically, due to the flow of the water, any elongated object will be carried head-on lengthwise through the passage and as a result comparatively short pieces may be caught in the intake. Again, any piece that passes the intake will travel head-on and consequently will pass the curve in the passage at 22 when that may be less than the maximum chord at the intake. Practically then, if the longitudinal chord of the curve of the passage at the dam is not less than the longitudinal chord at the intake, the result will be practically allowed.

When a closet bowl is constructed in this form, it is clear that any spherical object which passes the intake to the siphon or trap will very readily pass on through the entire structure and out at the choke without any difficulty. If a long article like a tooth brush or a spoon or a knife or an elongated jar is dropped into the bowl and is of such length that it will not pivot over the edge of the wall 31, it will consequently be caught at the intake and can be readily removed because accessible from the bowl. Any object that is of such length that it will pivot over the edge 31, as a broken tooth brush or a broken piece of comb, a pencil, or anything of that kind, will be carried along through the siphon because it has opportunity to pivot over the edge of the dam and reverse its direction and be carried on swiftly and surely past the choke and not clog the bowl or trap. This is due to the curve of either wall being such that the chord of any arc, which chord is tangent to the opposite wall is longer than the similar chord at the intake and to the effective rush and delivery of the water to the choke.

In the forms seen in Figs. 1, 5 and 6, the intake passage is recurved so that a slight ledge 11 is formed. This, however, is not necessary, as will be seen by inspecting Fig. 7 where the intake to the siphon is exactly vertical. The ledge 11 is of advantage.

I have described and illustrated my invention especially in a bowl with simple siphonic action. The intake feature to the trap and its form is also available in the blow-out type. Of course the blow-out type does not need a choke in the trap.

I have shown preferred forms of bowls embodying my invention. There are many styles and shapes adapted to different conditions and circumstances. I desire to claim the invention in its specific form and also broadly, as pointed out in the appended claims.

Having thus described my invention, what I claim as new and desire to secure by Letters Patent is:

1. A water closet bowl having a discharge having a trap and siphon connection with a dam, the inlet to the trap being recurved and formed with a curved wall extending around one edge of the discharge opening in curved relation, the trap and siphon passage extending upwardly and in a curved relation over the edge of the said dam conformed so that any chord of the arc of a curve on the wall of said passage which chord is tangential to the edge of the dam is greater than the shortest chord of any curve on the wall of the recurved intake passage which second mentioned chord contacts with the opposite wall of the opening, and a downwardly inclined passage from said dam ending in a choke, whereby any object passing the intake to the trap or siphon will be passed freely therethrough and out at the choke.

2. A water closet bowl having a discharge having a trap and siphon connection with a dam, the inlet to the trap being recurved and formed with a curved wall extending around one edge of the discharge opening in curved relation, the trap and siphon passage extending upwardly and in a curved relation over the edge of the said dam said curved wall of said inlet and said curved wall over said dam being conformed so that the longitudinal chord of the arc of the wall of said passage at the dam which chord is tangential to the dam is greater than the longitudinal chord of the arc of the recurved intake passage which second mentioned chord is tangential to the opposite edge of the discharge opening, and a downwardly inclined passage from said dam ending in a choke.

3. A water closet bowl having a discharge having a trap and siphon connection with a dam, the inlet to the trap being recurved and formed with a curved wall extending around one edge of the discharge opening in curved relation, and a discharge passage curved over said dam and downwardly inclined from said dam and ending in a choke, the curve of said inlet being so proportioned to any curve of said passage that objects that can pass around the curve of said inlet can pass any curve of said passageway, whereby any object passing the intake to the trap or siphon will be passed freely therethrough and out at the choke.

4. A water closet bowl having a discharge having a trap and an outlet passage curved over a dam, the inlet to the trap being recurved and formed with a curved wall extending around one edge of the discharge opening in curved relation, the curve of said inlet being so proportioned to any curve of said passage that objects that can pass around the curve of said inlet can pass any curve of said passageway, whereby any object passing the intake to the trap will be passed freely out.

5. A water closet bowl having a discharge having a trap and siphon connection with a dam, the inlet to the trap being recurved and formed with a curved wall extending around one edge of the discharge opening in curved relation, the trap and siphon passage extending upwardly and in a curved relation over the edge of the said dam conformed so that there is a chord of a curve on the wall of said siphon passage and tangent to said dam that is greater than the shortest chord of any curve on said curved wall and tangent to the edge of the discharge opening, a downwardly inclined passage from said dam ending in a choke, whereby any object passing the curve of the intake to the trap or siphon will pass freely the curves of the passage.

6. A water closet bowl having a discharge opening, a tortuous discharge passage, a trap, an inlet to said trap recurved and formed with a curved wall extending around an edge of the discharge opening in curved relation, said wall formed with a curve such that the shortest chord of any curve on said curved wall, which chord is tangent to said edge of the discharge opening is shorter than one chord of a curve on every curve of said discharge passage which second mentioned chord is tangent to the other side of said passage.

7. A water closet bowl having a discharge opening having a trap and a discharge passage having a siphon connection with a dam, the inlet to the trap being recurved around one edge of the discharge opening in curved relation and conformed so that any chord of the arc of a curve on the wall of said discharge passage, which chord is tangential to the wall of the discharge passage, is longer than the shortest chord of any curve on the wall of the recurved intake passage, which second mentioned chord is tangential to the opposite wall of said inlet passage.

8. A water closet bowl having a discharge having a trap and siphon connection with a dam, the inlet to the trap being recurved and formed with a curved wall extending around one edge of the discharge opening in curved relation, the trap and siphon passage extending upwardly and in a curved relation over the edge of the said dam, said curved wall of said inlet and said curved wall over said dam being conformed so that the longitudinal chord of the arc of the wall of said passage at the dam which chord is tangential to the dam is greater than the longitudinal chord of the arc of the recurved intake passage, which second mentioned chord is tangential to the opposite edge of the discharge opening.

CARL H. ZWERMANN.